US010439409B2

(12) United States Patent
Binder et al.

(10) Patent No.: US 10,439,409 B2
(45) Date of Patent: Oct. 8, 2019

(54) ENHANCED PARALLEL PROTECTION CIRCUIT

(71) Applicant: Microsoft Technology Licensing, LLC, Redmond, WA (US)

(72) Inventors: Julian Binder, Sunnyvale, CA (US); Daniel Chian, Los Altos, CA (US); Eugene Shoykhet, San Jose, CA (US); Ruchi Parikh, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 560 days.

(21) Appl. No.: 15/097,872

(22) Filed: Apr. 13, 2016

(65) Prior Publication Data

US 2017/0302064 A1 Oct. 19, 2017

(51) Int. Cl.
*H02J 7/00* (2006.01)
*H02H 3/10* (2006.01)
(Continued)

(52) U.S. Cl.
CPC ............. *H02J 7/0029* (2013.01); *H02H 3/05* (2013.01); *H02H 3/10* (2013.01); *H02H 5/04* (2013.01); *H02H 7/18* (2013.01); *H02J 7/0026* (2013.01)

(58) Field of Classification Search
CPC ........... H02J 7/0026; H02J 7/0029–031; H02J 2007/0037–004; H02J 7/00–36; H02H 3/05
See application file for complete search history.

(56) References Cited

U.S. PATENT DOCUMENTS 6,051,955 A * 4/2000 Saeki .................... H02J 7/0024 320/120
6,577,105 B1 * 6/2003 Iwaizono ............. H01M 2/348 320/134

(Continued)

FOREIGN PATENT DOCUMENTS

CN 1199935 A 11/1998
CN 1864300 A 11/2006

(Continued)

OTHER PUBLICATIONS

JP 2014-216189. Filed Oct. 23, 2014. Demonstrates priority for US2017/0324257.*

(Continued)

*Primary Examiner* — Ronald W Leja
*Assistant Examiner* — Christopher J Clark
(74) *Attorney, Agent, or Firm* — Newport IP, LLC; Scott Y. Shigeta

(57) ABSTRACT

An enhanced parallel protection circuit is provided. A system using separate battery packs in a parallel configuration is arranged with multiple protection circuit modules (PCMs). The PCMs are configured to detect fault conditions, such as over voltage, under voltage, excess current, etc. The PCMs can be configured to control associated switches and/or other components. When a fault condition is detected by an individual PCM, the individual PCM transitions to a fault state, and the PCM triggers an output causing one or more actions, e.g., causing a device to shut down or isolate one or more components. In addition, by the use of the techniques disclosed herein, the individual PCM can generate a control signal that causes other PCMs to transition to a fault state. The individual PCM can also receive a control signal from another PCM to cause the individual PCM to transition to a fault state.

28 Claims, 7 Drawing Sheets

(51) Int. Cl.

| | |
|---|---|
| ***H02H 5/04*** | (2006.01) |
| ***H02H 7/18*** | (2006.01) |
| ***H02H 3/05*** | (2006.01) |

(56) References Cited

U.S. PATENT DOCUMENTS

| | | | | |
|---|---|---|---|---|
| 7,068,012 B1 | 6/2006 | Geren et al. | | |
| 2009/0206841 A1 | 8/2009 | Weng | | |
| 2013/0187615 A1* | 7/2013 | Kimura | H02J 7/0031 | 320/134 |
| 2014/0203847 A1* | 7/2014 | Hafner | H02H 3/05 | 327/109 |
| 2014/0265639 A1* | 9/2014 | Kuroda | H02H 3/12 | 307/131 |
| 2015/0207347 A1* | 7/2015 | Hori | H01M 10/482 | 320/118 |
| 2016/0093921 A1* | 3/2016 | Kadirvel | H01M 10/48 | 320/112 |
| 2016/0190830 A1* | 6/2016 | Kuhlmann | H02J 7/0026 | 320/116 |
| 2016/0315486 A1* | 10/2016 | Shibata | H02J 7/0026 | |
| 2017/0117595 A1* | 4/2017 | Hase | H01M 2/34 | |
| 2017/0125999 A1* | 5/2017 | Yamamoto | H02H 3/05 | |
| 2017/0324257 A1* | 11/2017 | Adaniya | H02H 7/18 | |

FOREIGN PATENT DOCUMENTS

| | | |
|---|---|---|
| CN | 101399442 A | 4/2009 |
| CN | 105048574 A | 11/2015 |

OTHER PUBLICATIONS

PCT/US2017/026255—International Search Report and Written Opinion, dated Jul. 21, 2017, 14 pages.

"First Office Action Issued in Chinese Patent Application No. 201780023507.0", dated May 29, 2019, 13 pages.

* cited by examiner

ENHANCED PARALLEL PROTECTION CIRCUIT

BACKGROUND

Many developments have been made to improve the way batteries are used in mobile devices. For instance, some circuits provide safety features in case a battery is exposed to high levels of current. Although there have been some improvements in recent years, there are many shortcomings and inefficiencies when it comes to some current technologies. For example, some current battery protection schemes offer limited features when it comes to redundancy protection. When multiple protection circuits are utilized, some designs do not allow the protection circuits to communicate, and thus do not allow any type of coordination between protection circuits. Such designs can lead to an inhibited ability to protect a battery string, which is likely to lead to serious consequences, ranging from the unwanted discharge, overcharging, leakage or even fire.

The disclosure made herein is presented with respect to these and other considerations.

SUMMARY

An enhanced parallel protection circuit is provided and described herein. In some configurations, a system can include separate battery packs in a parallel configuration with multiple protection circuit modules (PCMs). The PCMs are configured to detect fault conditions, such as over voltage, under voltage, excess current, etc. The PCMs are configured to detect other types of fault conditions based on a temperature of a device and/or component. The PCMs can be configured to control associated switches and/or other components. When a fault condition is detected by an individual PCM, the individual PCM transitions to a fault state, and the PCM activates an output signal causing one or more components to transition. An activation of the output signal, for example, can cause a component, such as a switch, to transition to a state that can shut down or isolate one or more components. In addition, by the use of the techniques disclosed herein, the individual PCM can generate a control signal that causes other PCMs to transition to a fault state. The individual PCM can also receive a control signal from another PCM to cause the individual PCM to transition to a fault state. As will be described in more detail below, configurations disclosed herein mitigate occurrences where a multi-PCM device is operating after at least one PCM has detected a fault condition. Configurations disclosed herein provide safeguards and redundant protection in scenarios where a fault event is detected by one PCM and not detected by another PCM in a parallel configuration.

In one illustrative example, a multi-PCM system using multiple battery packs in a parallel configuration is arranged with sensors in communication with each PCM configured to detect fault conditions. When a fault condition is detected by a first PCM, the first PCM activates an output signal causing one or more components, e.g., a switch, to transition. In addition, the first PCM activates a control signal that is received by other PCMs, causing the other PCMs to transition to a fault state. The other PCMs each activate an output signal causing components in communication with the other PCMs to transition. The output signal of the first PCM remains activated while the fault condition detected by the first PCM is present. In addition, the control signal of the first PCM remains activated while the fault condition detected by the first PCM is present.

When the fault condition detected by the first PCM is no longer present, the first PCM deactivates the control signal providing an indication to other PCMs that the fault condition detected by the first PCM is no longer present. The first PCM also determines if the other PCMs have detected a fault condition. The output signal of the first PCM remains activated if at least one PCM of the other PCMs detects a fault condition and communicates an activated control signal to at least one input of the first PCM. When the control signal generated by the other PCMs indicates that no other PCM has detected a fault condition, and when the fault condition detected by the first PCM is no longer present, the first PCM deactivates the output signal.

The first PCM is also configured to transition to a fault state when the first PCM receives an activated control signal from another PCM detecting one or more fault conditions. When the first PCM receives an activated control signal from another PCM, the first PCM activates an output signal causing one or more components, e.g., a switch, to transition. When the control signal generated by the other PCMs is deactivated, e.g, the control signal indicates that no other PCM has detected a fault condition, and when the first PCM does not detect a fault condition, the first PCM deactivates the output signal.

It should be appreciated that the above-described subject matter may also be implemented as part of an apparatus, system, or as part of an article of manufacture. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
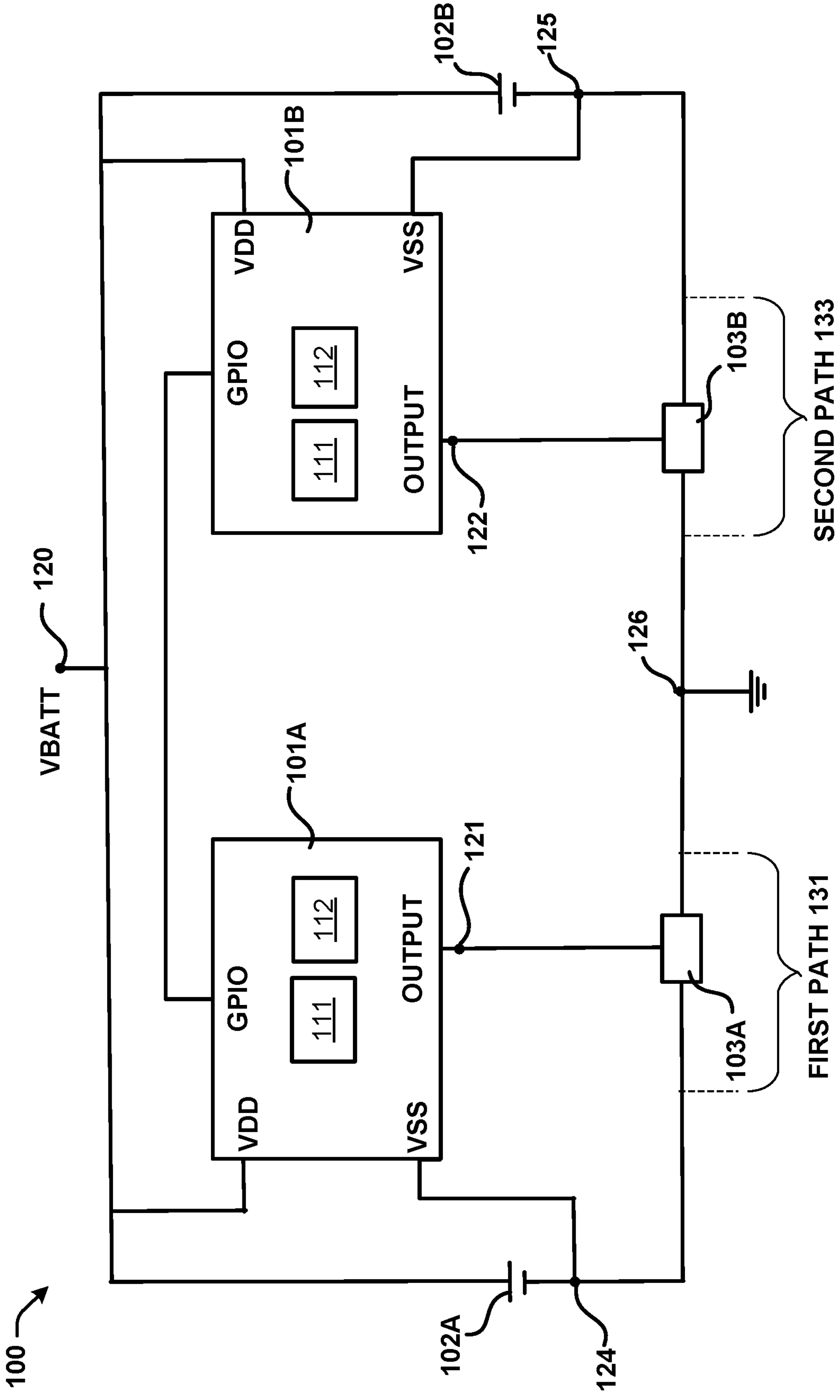
FIG. 1 shows a schematic diagram of an enhanced parallel protection circuit.

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims. For example, some examples illustrate a system having two batteries but it can be understood that the techniques described herein can be applied to systems will more than two batteries and more than two PCMs.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a wattage, current, voltage, or data signal. The terms, "gate," "drain," and "source," can also mean a "base," "collector" and "emitter," and/or equivalent parts.

An enhanced parallel protection circuit is provided and described herein. In some configurations, a system can include separate battery packs in a parallel configuration with multiple protection circuit modules (PCMs). The PCMs are configured to detect fault conditions, such as over voltage, under voltage, excess current, etc. The PCMs are configured to detect other types of fault conditions based on a temperature of a device and/or component. The PCMs can be configured to control associated switches and/or other components. When a fault condition is detected by an individual PCM, the individual PCM transitions to a fault state, and the PCM activates an output signal causing one or more components to transition. An activation of the output signal, for example, can cause a component, such as a switch, to transition to a state that can shut down or isolate one or more components. In addition, by the use of the techniques disclosed herein, the individual PCM can generate a control signal that causes other PCMs to transition to a fault state. The individual PCM can also receive a control signal from another PCM to cause the individual PCM to transition to a fault state. In some configurations, an individual PCM does not transition from the fault state to a normal operating state until all PCMs indicate they do not detect a fault condition. As described herein, configurations disclosed herein mitigate occurrences where a multi-PCM device is operating after at least one PCM has detected a fault condition. Configurations disclosed herein provide safeguards and redundant protection in scenarios where a fault condition is detected by one PCM and not detected by another PCM in a parallel configuration. Configurations disclosed herein mitigate occurrences where a multi-PCM device is operating after at least one PCM has shut down.

FIG. 1 shows a schematic diagram of a parallel protection circuit 100, also referred to herein as the "circuit 100." As shown, the circuit 100 includes a first PCM 101A and a second PCM 101B, both of which can be individually and generically referred to herein as a "PCM 101." In addition, the circuit 100 can include a first battery 102A and a second battery 102B, both of which can be individually and generically referred to herein as a "battery 102." It can be appreciated that this example circuit 100 is provided for illustrative purposes and is not to be construed as limiting. Techniques, system and apparatuses disclosed herein can be applied to any suitable circuit 100 having two or more PCMs 101 and any number of batteries 102.

In some configurations, an individual PCM 101 includes one or more inputs and at least one output. The PCMs 101 are configured to transition to a fault state when a value of a signal at the one or more inputs meets or exceeds one or more thresholds. For example, an individual PCM 101 can have one or more sensors 111 to detect a voltage and/or current with respect to a first input (VDD) and/or a second input (VSS). Any suitable threshold or combination of suitable thresholds can be used with the techniques disclosed herein. For example, a threshold for preventing a voltage and/or current that is capable of damaging at least one battery 102 or any other component can be used with the techniques disclosed herein. The one or more sensors 111 can be configured with one or more components for detecting a temperature, level of humidity, air pressure or any other condition that can affect the circuit 100 or other components.

To coordinate the PCMs 101 of the circuit 100, an individual PCM 101 can also include a general-purpose input/output (referred to herein as a "GPIO" or a "control interface"). In some configurations, the GPIO of each PCM 101 is coupled to a common node. The GPIO can function in two modes: (1) an input mode for detecting an activated control signal or detecting a deactivated control signal; and (2) an output mode for generating an activated control signal or generating a deactivated control signal. While the GPIO is in output mode, an output control signal can be at a high level, e.g., greater than 2 volts, or at a low level, 0 volts or less than a volt. For illustrative purposes, a control signal can default to a high level. "Activation" of the control signal can include a transition of the control signal from a high level to a low level. For illustrative purposes, an "activated" control signal remains at a low level until the control signal is "deactivated." The "deactivation" of the control signal can include a transition of the control signal from a low level to a high level. For illustrative purposes, a "deactivated" control signal remains at a high level until the control signal is "activated."

In some configurations, each GPIO is configured such that, when GPIOs of multiple PCMs are coupled to a common node, the activation of a control signal generated by any single GPIO causes the control signal at the node to be low. This can be achieved by any suitable design, one which may include an open drain configuration. Thus, any GPIO operating in the input mode can detect an activated control signal generated by at least one PCM 101, even if another PCM 101 is generating a deactivated control signal.

As summarized above, the circuit 100 can comprise any number of PCMs 101. In such configurations, the GPIO of each PCM 101 can be coupled to the same node to enable the coordination disclosed herein. These examples are provided for illustrative purposes and is not to be construed as limiting, it can be appreciated that an individual PCM 101 can produce any suitable voltage level for an activated or deactivated control signal. For illustrative purposes, the examples disclosed herein include an "activated" control signal that includes a transition from a high level to a low level. Alternatively, to accommodate other components, an "activated" control signal can include a transition from a low level to a high level, and a "deactivated" control signal can include a transition from a high level to a low level.

In one illustrative example, an individual PCM 101 can have a normal operating state and at least one fault state. A PCM 101 can be configured to transition from the normal operating state to a fault state when an activated control signal is received at the GPIO. In addition, a PCM 101 can be configured to transition from a normal operating state to a fault state when one or more sensors 111 of a PCM 101 detects a fault condition. When a fault condition is detected by one or more sensors 111 of a particular PCM 101, that particular PCM generates an activated control signal at its GPIO. The activation of the control signal by at least one PCM causes all other PCMs to transition to a fault state. Additional details regarding the GPIO and other operating states of a PCM 101 are described in more detail below.

When an individual PCM 101 transitions to a fault state, the PCM 101 activates one or more outputs to control one or more components. In this example, an output of the first PCM 101A is coupled to a first node 121 and an output of the second PCM 101B is coupled to a second node 122. When the first PCM 101A transitions to a fault state, the first PCM 101A activates the output coupled to the first node 121. Similarly, when the second PCM 101B transitions to a fault state, the second PCM 101B activates the output coupled to the second node 122.

In some configurations, when in the normal operating state, the output of an individual PCM 101 can be at a high level, and when in a fault state, an output can be at a low level. This example is provided for illustrative purposes and is not to be construed as limiting, it can be appreciated that an individual PCM 101 can produce any suitable voltage level as an output for either state. For illustrative purposes, the examples disclosed herein include an "activated" output that includes a transition from a high level to a low level. Alternatively, to accommodate other components, an "activated" output can include a transition from a low level to a high level, and a "deactivated" output can include a transition from a high level to a low level.

The circuit 100 can also include one or more components that are controlled by the PCMs 101. For example, the circuit 100 can include one or more switches that control connectivity paths between two or more components, a component and a ground node, a component and a power source node, or a component and another device. In one illustrative example, the circuit 100 can include a first switch 103A and a second switch 103B ("switches 103"). Switches are used in the examples for illustrative purposes and are not to be construed as limiting. It can be appreciated that other components, e.g., controllable resistors, transistors, or op amps, can be controlled by an output of any PCM 101 to accommodate other designs.

In the example of FIG. 1, the first switch 103A comprises an input coupled to the first node 121. The first switch 103A can also be configured to create a high impedance path or an open circuit for the first path 131 when the first switch 103A is "off." The first switch 103A can be configured to turn "off" when the output of the first PCM 101A at the first node 121 is activated. The first switch 103A can be configured to create a low impedance path or a closed circuit for a first path 131 when the first switch 103A is "on." The first switch 103A can be configured to turn "on" when the output of the first PCM 101A at the first node 121 is deactivated. In this example, the first path 131 couples an anode of the first battery 102A to a ground node 126.

The second switch 103B comprises an input coupled to the second node 122. The second switch 103B can also be configured to create a high impedance path or an open circuit for the second path 133 when the second switch 103B is "off." The second switch 103B can be configured to turn "off" when the output of the second PCM 101B at the second node 123 is activated. The second switch 103B can be configured to create a low impedance path or a closed circuit for a second path 133 when the second switch 103B is "on." The second switch 103B can be configured to turn "on" when the output of the second PCM 101B at the second node 123 is deactivated. In this example, the second path 133 couples an anode of the second battery 102B to the ground node 126.

Figure 2:
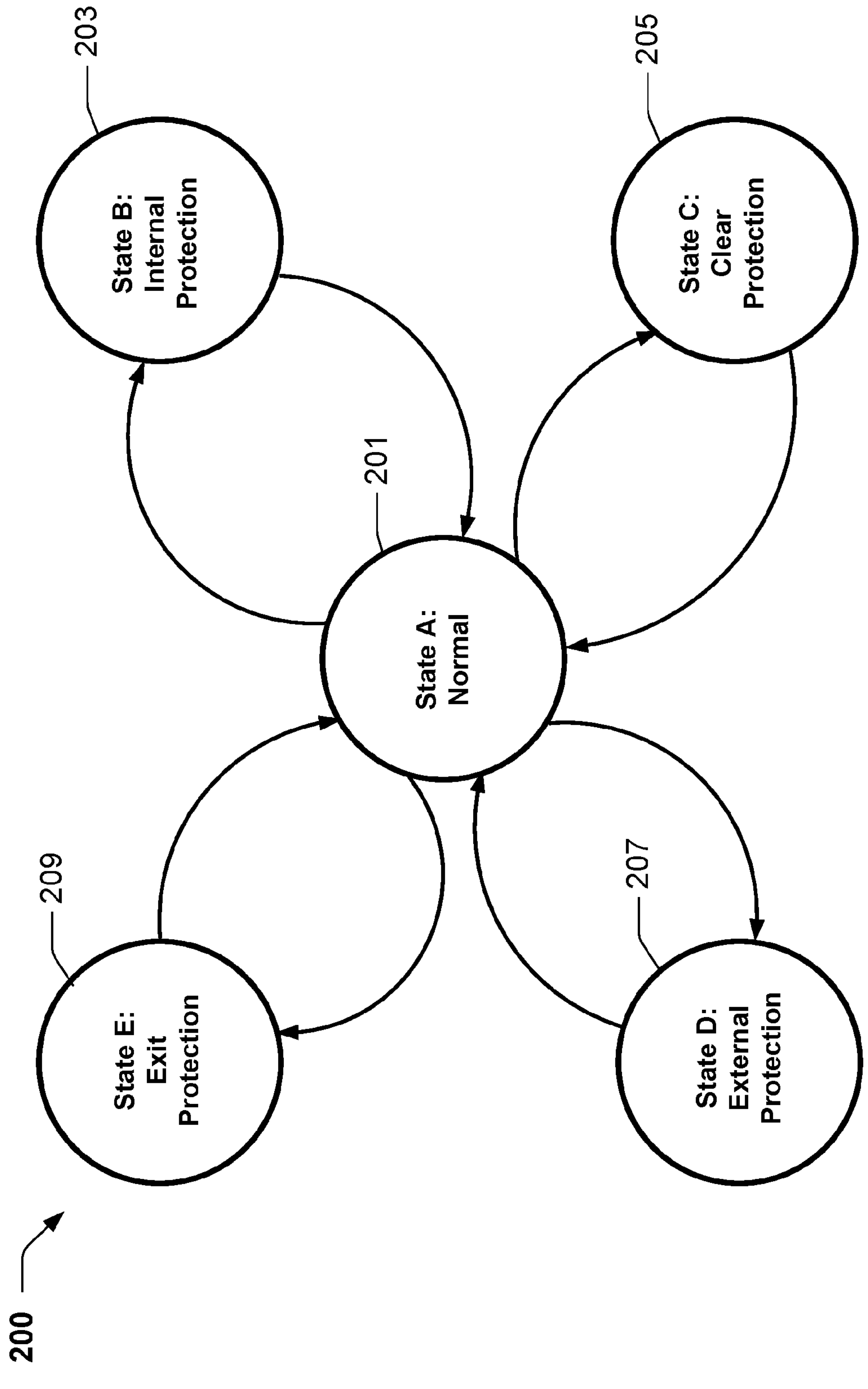
FIG. 2 shows a state diagram illustrating aspects of a protection circuit module.

In some configurations, the operating states of each PCM 101 can be controlled by a state machine 112. FIG. 2 shows a state diagram illustrating aspects of an example set of operating states of the PCMs 101. As shown in FIG. 2, a PCM can have at least five states. Generally described, in State A, a PCM 101 is in a "normal operating state," where no fault condition is detected by one or more sensors and no active control signals are received at GPIO. In State B, a PCM 101 is in an "internal protection state," where a sensor of a PCM 101 detects a fault condition. In the internal protection state, the output is activated and the control signal generated by the PCM 101 is activated. In State C, a PCM 101 is in a "clear protection state," where the sensor of the PCM 101 no longer detects the fault condition. In the clear protection state, the control signal generated at the GPIO is deactivated, and the output remains activated. In State D, a PCM 101 is in an "external protection state," where a PCM 101 receives an activated control signal at a GPIO. In the external protection state, the output of a PCM is activated. In State E, a PCM 101 is in an "exit protection state," where the sensor of a PCM no longer detects a fault condition, and where the PCM 101 only detects deactivated control signals received at the GPIO from other PCMs 101. In the exit protection state, the output of a PCM and a control signal generated at the GPIO of the PCM are both deactivated. These examples are for illustrative provided for illustrative purposes and are not to be construed as limiting.

In the example circuit of FIG. 1, when both PCMs 101 are in a normal operating state, both outputs are both deactivated. In some configurations, a deactivated output of each PCM 101 is at a high level thus causing the first switch 103A and the second switch 103B to be "on." Also, in the normal operating state, the control signal generated at the GPIO of the first PCM 101A and the control signal generated at the GPIO of the second PCM 101B are both deactivated.

An individual PCM 101 can transition to State B, the internal protection state, when the individual PCM 101 detects a fault condition using one or more sensors 111. Generally described, in State B, an individual PCM 101 can activate an output signal and activate a control signal. For example, if a sensor 111 of the first PCM 101A detects a current above a threshold, the first PCM 101A activates the control signal at the GPIO and the output at the first node 121.

An individual PCM 101 can transition to State D, the external protection state, when an individual PCM 101 receives an activated control signal at the GPIO. In continuing the example above, when the first PCM 101A activates the control signal at the GPIO of the first PCM 101A, the second PCM 101B receives the activated control signal and transitions to the external protection state. In the external protection state, the second PCM 101B activates the output at the second node 122.

An individual PCM 101 can transition to State C, the clear protection state, when an individual PCM 101 no longer detects the fault condition. In continuing the above example, the first PCM 101A can transition to the clear protection state when the sensor(s) 111 of the first PCM 101A no longer detect the fault condition. In the clear protection state, the first PCM 101A deactivates the control signal generated at the GPIO of the first PCM 101A. In some configurations, the output of a PCM 101 is not deactivated in the clear protection state. Thus, in the current example, when the first PCM 101A is in the clear protection state, even when the fault condition is no longer detected, the output of the first PCM 101A remains activated.

An individual PCM 101 can transition to State E, the exit protection state, when the fault condition is no longer detected by the first PCM 101A and when no other PCM 101 is generating an activated control signal. In continuing the above example, after the first PCM 101A has transitioned to State C, e.g., the fault condition is no longer detected by the first PCM 101A, the first PCM 101A determines if any other PCM 101 in the circuit 100 is generating an active control signal. When it is determined that no other PCM 101 in the circuit 100 is generating an active control signal, e.g., the control signals received by all PCMs 101 at the GPIO of the first PCM 101A are deactivated, the first PCM 101A transitions to the exit protection state. In the exit protection state, the first PCM 101A deactivates the output at the first node 121. However, in this example, if the second PCM 101B is generating an active control signal, e.g., the second PCM 101B has detected a fault condition, the first PCM 101A will not transition to the exit protection state.

Figure 3:
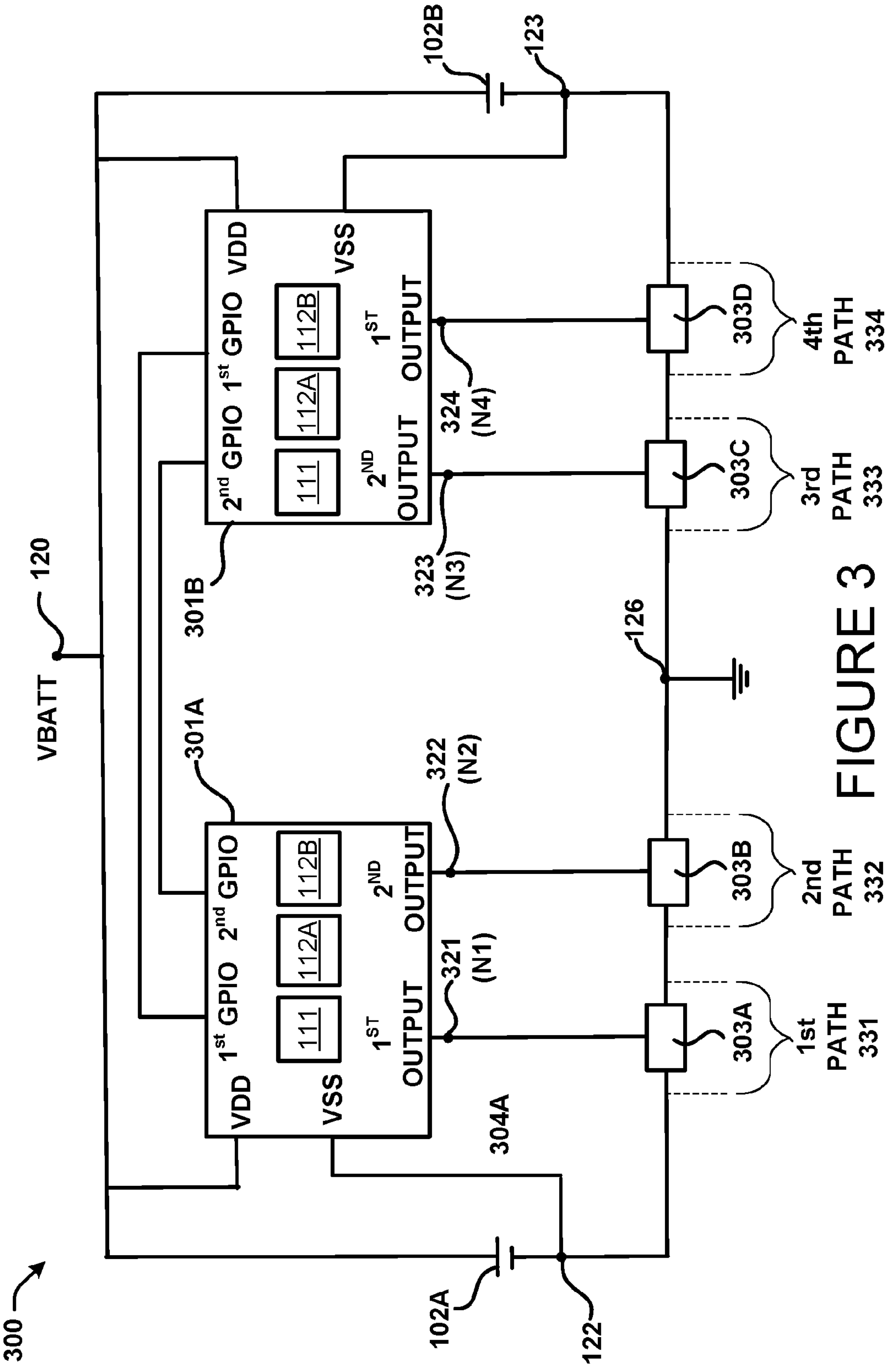
FIG. 3 shows a schematic diagram of an enhanced parallel protection circuit where individual protection circuits include multiple outputs that are coupled in accordance with the configurations disclosed herein.

Referring now to FIG. 3, a schematic diagram of an enhanced parallel protection circuit 300 ("circuit 300") having individual protection circuits modules with multiple outputs are shown and described below. As shown, the circuit 300 includes a first PCM 301A and a second PCM 301B. In addition, the circuit 300 can include a first battery 102A and a second battery 102B. It can be appreciated that this example circuit 300 is provided for illustrative purposes and is not to be construed as limiting. Techniques, systems and apparatuses disclosed herein can be applied to any circuit having two or more PCMs 301 and any number of batteries 102.

In general, configurations with multiple outputs can include at least one input, a GPIO, and a state machine 112 associated with each output. Thus, other PCM designs, such as a PCM with a third output, can include a third set of inputs (VSS and/or VDD), a third GPIO, and a third state machine 112, configured in a manner as described above. When configurations include more than two PCMs 301, the GPIO of each PCM 301 is coupled to the GPIO of the first PCM 301A and the GPIO of the second PCM 301B.

As shown in FIG. 3, the first PCM 301A comprises one or more inputs (VDD and VSS), a first output coupled to a first node 321, a second output coupled to a second node 322. The first PCM 301A is configured to transition to a first fault state and activate the first output coupled to the first node 321 when one or more values of at least one signal at the one or more inputs (VDD and/or VSS) of the first PCM 301A meet or exceed a first set of criteria. For example, a signal could exceed a first set of criteria if a current or voltage exceeds a threshold in a first direction. In addition, the first PCM 301A is configured to transition to a second fault state and activate the second output coupled to the second node 322 when the one or more values of the at least one signal at the one or more inputs of the first PCM 301A meet or exceed a second set of criteria. For example, a signal could exceed a second set of criteria if a current or voltage exceeds a threshold in a second direction.

The second PCM 301B comprises one or more inputs (VDD and VSS), a first output coupled to a fourth node 324, and a second output coupled to a third node 323. The second PCM 301B is configured to transition to a first fault state and activate the output coupled to the third node 323 when one or more values of at least one signal at the one or more inputs (VDD and/or VSS) of the second PCM 301B meet or exceed the first set of criteria. The second PCM 301B is configured to transition to the second fault state and activate the output coupled to the fourth node 324 when the one or more values of the at least one signal at the one or more inputs of the second PCM meet or exceed the second set of criteria. As summarized above, any suitable set of criteria can be used for either fault state, including criteria that is needed to protect a component of the circuit 300 or any device or component connected to the circuit 300. In one illustrative example, the first output and the second output can respectively referred to as a first charge pump output (DSG) and a second charge pump output(CHG).

The first PCM 301A also comprises a first GPIO and a second GPIO. The second PCM 301B also comprises a first GPIO and a second GPIO. The first GPIO of the first PCM 301A is coupled to the first GPIO of the second PCM 301B. The second GPIO of the first PCM 301A is coupled to the second GPIO of the second PCM 301B. For illustrative purposes, since some configurations include a state machine 112, or other suitable controller, for each output the individual PCMs 301 can each comprise a first state engine 112A and a second state engine 112B. In this example, the first state engine 112A is associated with the first output, and the second state engine 112B is associated with the second output. Thus, the individual PCMs 301 can have two independent engines, each operating in a manner described above with reference to FIG. 2.

When the first PCM 301A detects a first fault condition, e.g., when one or more values of at least one signal at the one or more inputs of the first PCM 301A meet or exceed the first set of criteria, the first PCM 301A transitions to the first fault state. More specifically, the first state engine 112A of the first PCM 301A transitions to the internal protection state based on the first set of criteria. When the first state engine 112A is in the internal protection state, the first PCM 301A activates the first output coupled to the first node 321, and generates an active control signal at the first GPIO of the first PCM 301A. In response to receiving the active control signal generated at the first GPIO of the first PCM 301A, the first state engine 112A of the second PCM 301B transitions to the external fault state, thereby causing the second PCM 301B to activate the first output coupled to the fourth node 324.

When the first PCM 301A detects a second fault condition, e.g., when one or more values of at least one signal at the one or more inputs of the first PCM 301A meet or exceed the second set of criteria, the first PCM 301A transitions to the second fault state. More specifically, the second state engine 112B of the first PCM 301A transitions to the internal protection state based on the second set of criteria. When the second state engine 112B is in the internal protection state, the first PCM 301A activates the second output coupled to the second node 322, and generates an active control signal at the second GPIO of the first PCM 301A. In response to receiving the active control signal generated at the second GPIO of the first PCM 301A, the second state machine 112B of the second PCM 301B transitions to the external fault state, thereby causing the second PCM 301B activate the second output coupled to the third node 323.

When the second PCM 301B detects a first fault condition, e.g., when one or more values of at least one signal at the one or more inputs of the second PCM 301B meet or exceed the first set of criteria, the second PCM 301B transitions to the first fault state. More specifically, the first state engine 112A of the second PCM 301B transitions to the internal protection state based on the first set of criteria. When the first state engine 112A is in the internal protection state, the second PCM 301B activates the first output coupled to the fourth node 324, and generates an active control signal at the first GPIO of the second PCM 301B. In response to receiving the active control signal generated at the first GPIO of the second PCM 301B, the first state engine 112A of the first PCM 301A transitions to the external fault state, thereby causing the first PCM 301A to activate the first output coupled to the first node 321.

When the second PCM 301B detects a second fault condition, e.g., when one or more values of at least one signal at the one or more inputs of the second PCM 301B meet or exceed the second set of criteria, the second PCM 301B transitions to the second fault state. More specifically, the second state engine 112B of the second PCM 301B transitions to the internal protection state based on the second set of criteria. When the second state engine 112B is in the internal protection state, the second PCM 301B activates the second output coupled to the third node 323, and generates an active control signal at the second GPIO of the second PCM 301B. In response to receiving the active control signal generated at the second GPIO of the second PCM 301B, the second state engine 112B of the first PCM 301A transitions to the external fault state, thereby causing the first PCM 301A to activate the second output coupled to the second node 322.

In another illustrative example, when the first PCM 301A and the second PCM 301B both detect a first fault condition, e.g., when one or more values of at least one signal at the one or more inputs of the first PCM 301A and the second PCM 301B meet or exceed the first set of criteria, the first PCM 301A and the second PCM 301B transition to the first fault state. More specifically, the first state engine 112A of the first PCM 301A transitions to the internal protection state based on the first set of criteria. In addition, the first state engine 112A of the second PCM 301B transitions to the internal protection state based on the first set of criteria.

When the first state engine 112A of the first PCM 301A is in the internal protection state, the first PCM 301A activates the first output coupled to the first node 321, and generates an active control signal at the first GPIO of the first PCM 301A. When the first state engine 112A of the second PCM 301B is in the internal protection state, the second PCM 301B activates the first output coupled to the second node 322, and generates an active control signal at the first GPIO of the second PCM 301B.

In the current example, when the first PCM 301A no longer detects the first fault condition and the second PCM 301B still detects the first fault condition, the first PCM 301A deactivates the control signal at the first GPIO of the first PCM 301A, however, the output signals at the first output coupled to the second node 321 and the first output coupled to the second node 322 remain activated since the second PCM 301B still detects the first fault condition. When the first PCM 301A and the second PCM 301B both no longer detect the first fault condition, the output signal at the first output coupled to the second node 321 and the output signal at the first output coupled to the second node 322 are deactivated.

A similar scenario applies to the circuit 300 when a second fault condition is detected by both PCMs 301. When both PCMs 301 detect a second fault condition, the second output for both PCMs 301 are activated and the control signal generated at the second GPIO for both PCMs 301 are activated. The outputs for both PCMs 301 are deactivated when both PCMs 301 no longer detect the second fault condition. It can also be appreciated that both PCMs 301 can detect both a first fault condition and a second fault condition. In such a scenario, all control signals and all four outputs can be activated. Each control signal and each output can be deactivated based on the techniques disclosed herein.

In some configurations, an individual PCM 301 can activate all outputs and all control signals when the first fault condition or the second fault condition is detected. For example, the first PCM 301A can activate the first output coupled to the first node 321 and activate the second output coupled to the second node 322 in response to one or more values of at least one signal at the one or more inputs (VDD and/or VSS) of the first PCM 301A meeting or exceeding the first set of criteria. In such a configuration, the first PCM 301A can also activate the first control signal at the first GPIO and second GPIO of the first PCM 301A in response to one or more values of at least one signal at the one or more inputs (VDD and/or VSS) of the first PCM 301A meeting or exceeding the first set of criteria.

The first PCM 301A can also be configured to activate the first output coupled to the first node 321, activate the second output coupled to the second node 322, activate the first control signal at the first GPIO of the first PCM 301A, and activate the second control signal at the second GPIO of the first PCM 301 in response to one or more values of at least one signal at the one or more inputs (VDD and/or VSS) of the first PCM 301A meeting or exceeding the second set of criteria. The second PCM 301B, and other PCMs arranged in a parallel configuration, can be configured in the same manner, e.g., configured to activate all outputs and activate all control signals in response to the detection of either the first fault condition or the second fault condition. With such an arrangement, the circuit 300 can activate all outputs when any type of fault condition is detected, and all outputs can remain activated until all fault conditions are no longer detected.

The aspects of the state diagram of FIG. 2 can be utilized by each state machine 112 of each PCM 301. Thus, in some configurations, an activated output of a PCM 301 can remain activated until all PCMs 301 have indicated that no other like fault conditions are detected. Thus, in expanding the examples above, if the first PCM 301A and the second PCM 301B both detect a first fault condition, the first PCM 301A is configured to maintain an active output at first output until the second PCM 301B indicates, via a control signal at the first GPIO, that the second PCM 301B no longer detects the first fault condition. In addition, the second PCM 301B is configured to maintain an active output at first output until the first PCM 301A indicates, via the control signal, that the first PCM 301A no longer detects the first fault condition. When both the first PCM 301A and the second PCM 301B no longer detect the presence of the first fault condition, first PCM 301A and the second PCM 301B can both deactivate the associated outputs, e.g., the first output of the first PCM 301A and first output of the second PCM 301B.

Similarly, if the first PCM 301A and the second PCM 301B both detect a second fault condition, the first PCM 301A is configured to maintain an active output until all PCMs 301 have indicated that no other like fault conditions are detected. If the first PCM 301A and the second PCM 301B both detect a second fault condition, the first PCM 301A is configured to maintain an active output at second output until the second PCM 301B indicates, via a control signal at the second GPIO, that the second PCM 301B no longer detects the second fault condition. In addition, the second PCM 301B is configured to maintain an active output at second output until the first PCM 301A indicates, via the control signal, that the first PCM 301A no longer detects the second fault condition. When both the first PCM 301A and the second PCM 301B no longer detect the presence of the second fault condition, first PCM 301A and the second PCM 301B can both deactivate the associated outputs, e.g., the second output of the first PCM 301A and second output of the second PCM 301B.

Figure 4:
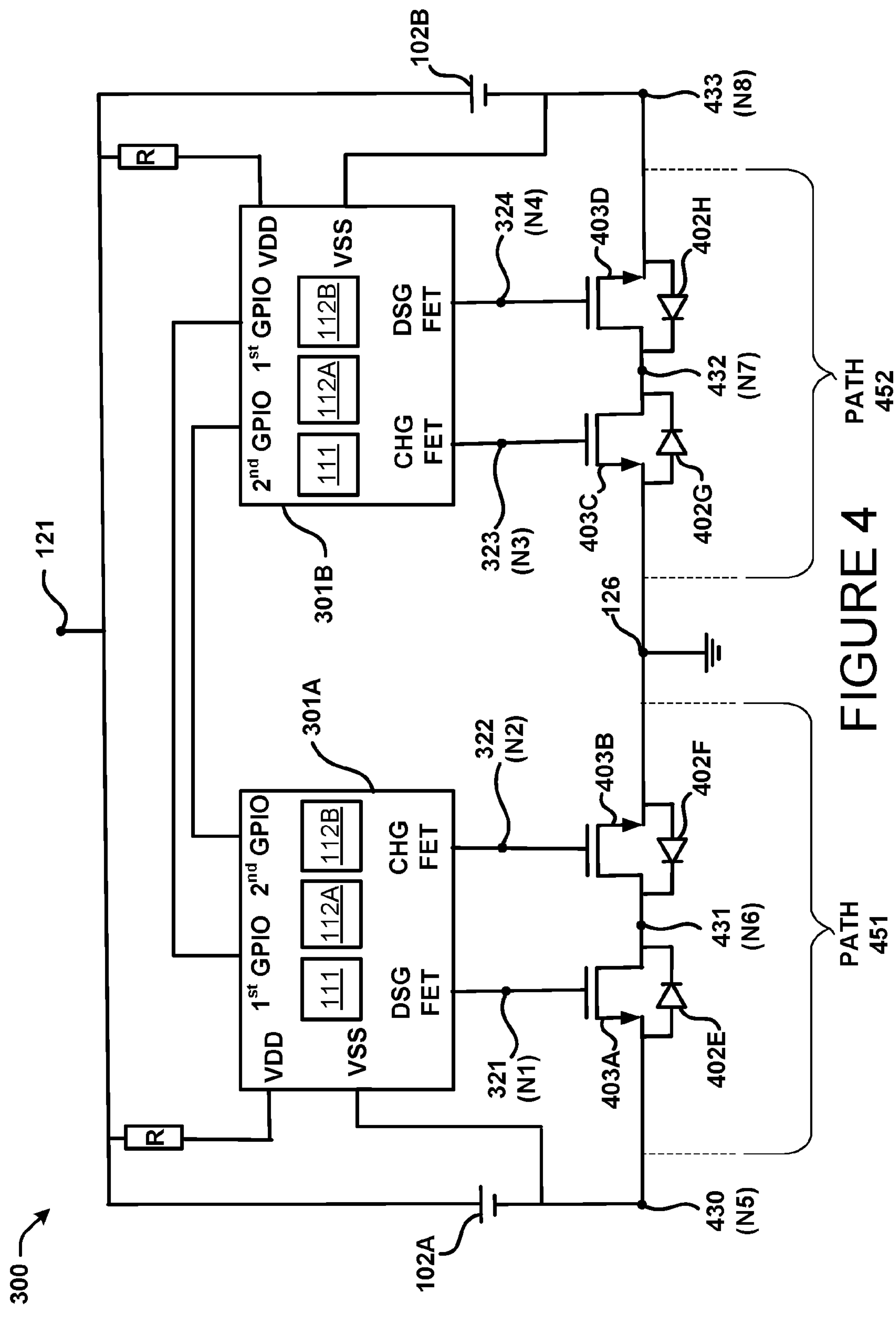
FIG. 4 shows a schematic diagram illustrating details of components shown in FIG. 3.

Referring now to FIG. 4, aspects of the switches (303 of FIG. 3) are shown and described below. In one illustrative example, the circuit 300 comprises a first transistor 403A, second transistor 403B, third transistor 403C, fourth transistor 403D, first diode 402E, second diode 402F, third diode 402G, and a fourth diode 402H.

In this example, a gate of the first transistor 403A is coupled to the first node 321 and the source of the first transistor 403A is coupled to the anode of the first battery 102A. The drain of the first transistor 403A is coupled to the drain of the second transistor 403B. The cathode of the first diode 402E is coupled to the drain of the first transistor 403A and the drain of the second transistor 403B. The anode of the first diode 402E is coupled to the source of the first transistor 403A and the anode of the first battery 102A. The gate of the second transistor 403B is coupled to the second node 322, and the source of the second transistor 403B is coupled to the ground node 126. The cathode of the second diode 402F is coupled to the drain of the first transistor 403A and the drain of the second transistor 403B. The anode of the second diode 402F is coupled to the source of the second transistor 403B and the ground node 126.

Also shown in FIG. 4, the gate of the third transistor 403C is coupled to the third node 323, and the drain of the third transistor 403C is coupled to the drain of the fourth transistor 403D. The source of the third transistor 403C is coupled to the ground node 126. The anode of the third diode 402G is coupled to the ground node 126 and the source of the third transistor 403C. The cathode of the third diode 402G is coupled to the drain of the third transistor 403C and the drain of the fourth transistor 403D.

In addition, in this example, the gate of the fourth transistor 403D is coupled to the fourth node 324. The source of the fourth transistor 403D is coupled to the anode of the second battery 102B. The anode of the fourth diode 402H is coupled to the source of the fourth transistor 403D and the anode of the second battery 102B. The cathode of the fourth diode 402H is coupled to the drain of the third transistor 403C and the drain of the fourth transistor 403D. It can be appreciated that other components and/or arrangements can be used to achieve the techniques described herein as these examples are provided for illustrative purposes.

The techniques disclosed herein enable a single PCM to control a resistance level within multiple paths, such as the paths 331-334 of FIG. 3 or the paths 451-452 of FIG. 4. In addition to controlling a level of resistance, a single PCM can also control the direction of current within multiple paths. In the example shown in FIG. 4, when the first PCM 301A and the second PCM 301B are in an operating state, current is free to flow in both directions in the two paths 451 and 452. When the first PCM 301A and/or the second PCM 301B transition to the first fault state, the current in two different paths 451 and 452 can be controlled to flow in a first direction. In addition, when the first PCM 301A and/or the second PCM 301B transition to the second fault state, the current in two different paths 451 and 452 can be controlled to flow in a second direction. In addition, with the first PCM 301A and/or the second PCM 301B transition to both the first fault state and the second fault state, the two different paths 451 and 452 can transition to a high level of resistance or an open circuit. It can be appreciated that resistance levels in other paths, such as a path between the fifth node 430 and the sixth node 431, a path between the sixth node 431 and the ground node 126, a path between the ground node 126 and the seventh node 432, and a path between the seventh node 432 and the eighth node 433, can be controlled by the techniques disclosed herein.

It can be appreciated that techniques disclosed herein can control the direction of current and/or a level of resistance for any path connecting or more nodes of a circuit. The examples are provided for illustrative purposes and are not to be construed as limiting. Although the aforementioned examples illustrate paths that couple a battery to a ground note, it can be appreciated that the paths having controlled levels and/or directions of resistance can couple components of a device, couple components to a ground node, couple components to a power source, or couple components to other devices. For illustrative purposes, FIG. 5, FIG. 6, and FIG. 7 illustrate other configurations where the techniques disclosed herein control multiple paths between a power source node (VBATT) and the cathode of multiple batteries.

Figure 5:
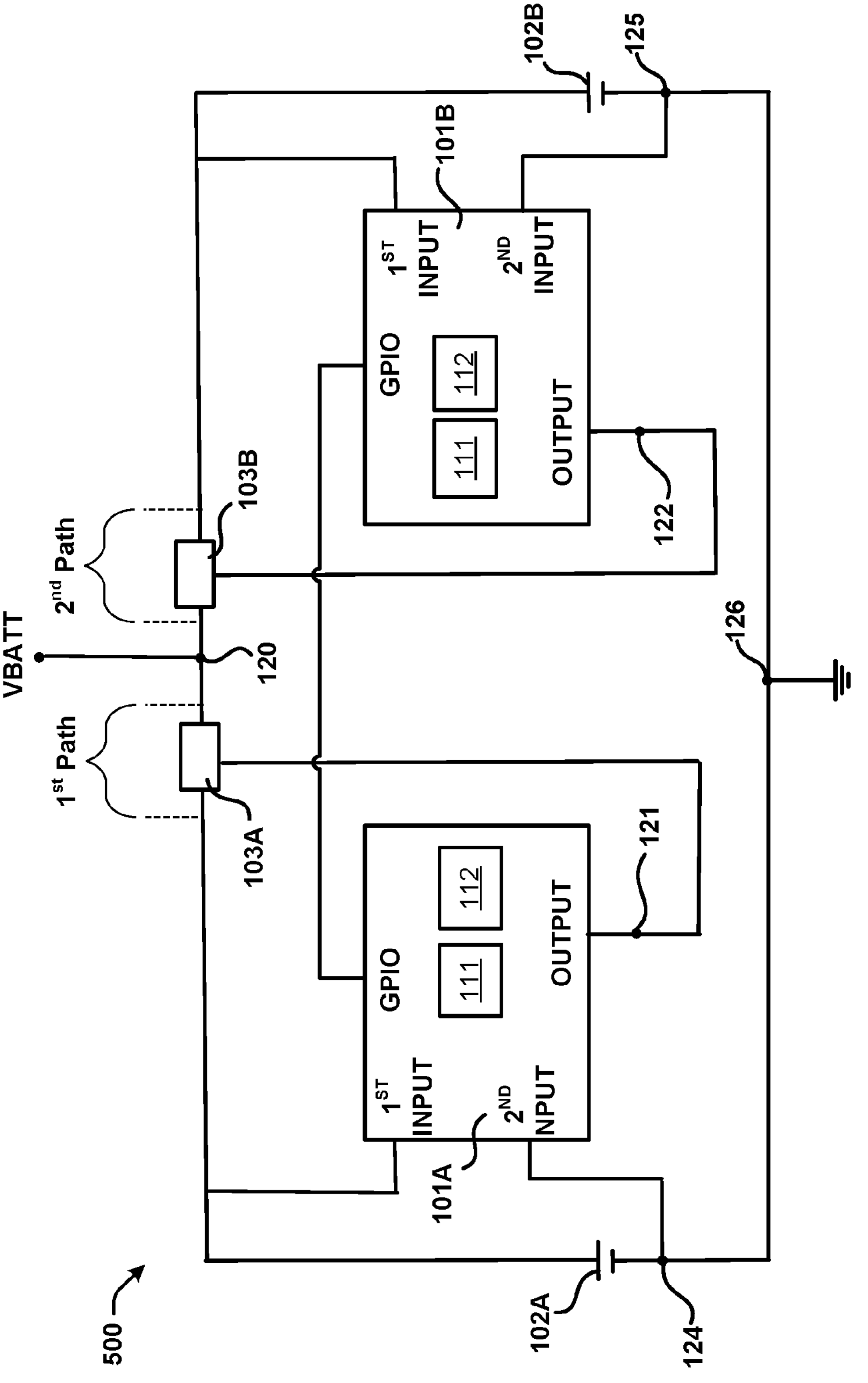
FIG. 5 shows a schematic diagram of an enhanced parallel protection circuit having components for controlling paths of connectivity between a power source node and multiple batteries.

FIG. 5 shows a schematic diagram of an enhanced parallel protection circuit 500 having switches controlling paths of connectivity between a power source node 121 and two batteries. Some components of FIG. 5 are configured in a manner similar to the circuit 100 shown in FIG. 1. However, in the example shown in FIG. 5, the first switch 103A is configured to control the connection between the cathode of the first battery 102A to the power source node 120 ("VDD"). In addition, the second switch 103B is configured to control the connection between the cathode of the second battery 102B to the power source node 120. The power source node 120 can be coupled to an external power source, e.g., a charger, and/or a load, e.g., a motherboard of a device.

Figure 6:
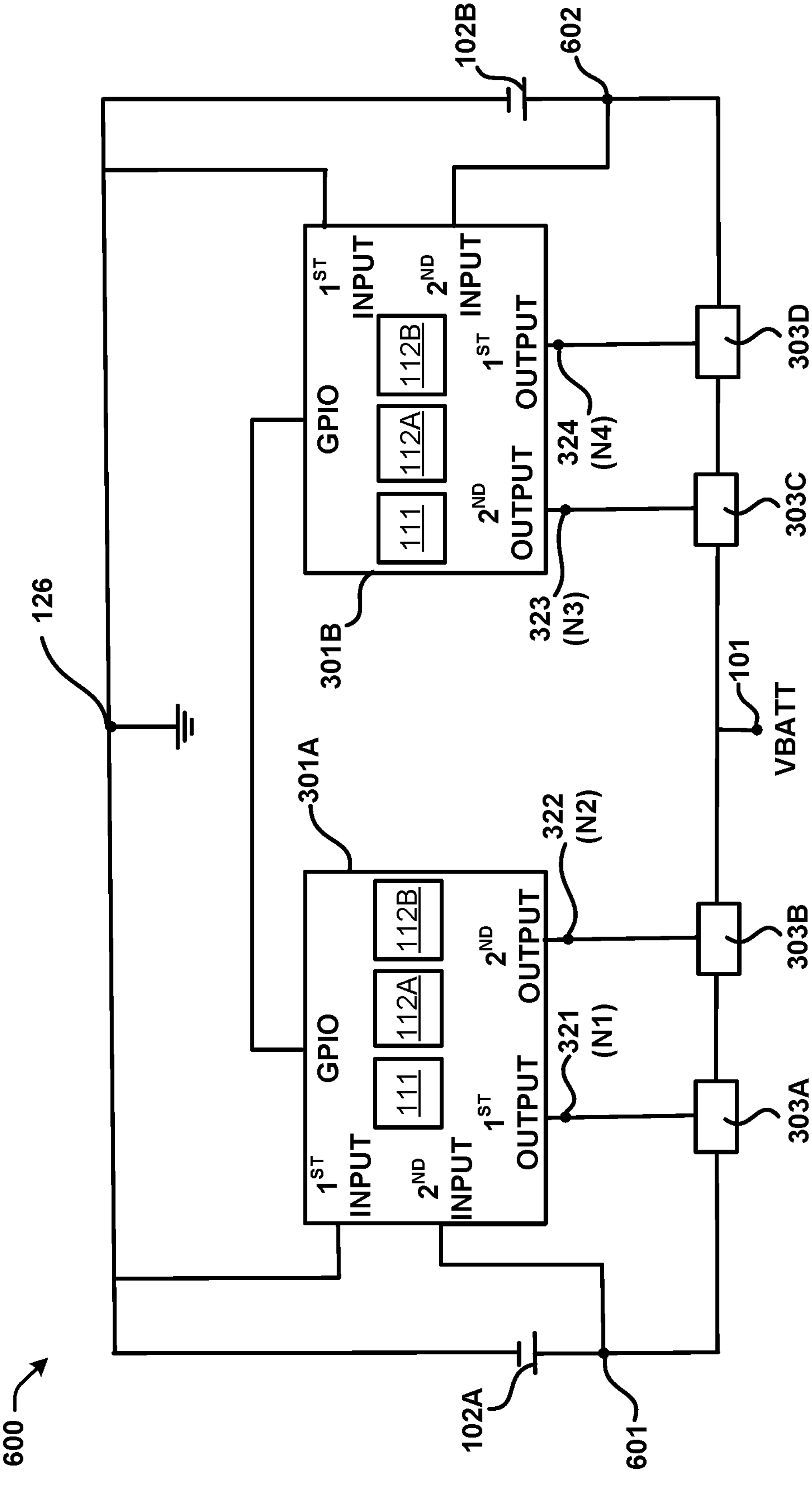
FIG. 6 shows a schematic diagram of an enhanced parallel protection circuit where individual protection circuits include multiple outputs that are coupled to components for controlling paths of connectivity between a power source node and multiple batteries.

FIG. 6 shows a schematic diagram of another enhanced parallel protection circuit 600 having switches configured to control the connection between a power source node 101 and two batteries. Some components of FIG. 6 are configured in a manner similar to the circuit 300 shown in FIG. 3. However, in the example shown in FIG. 6, the first switch 103A is configured to control the connection between the cathode of the first battery 102A to the power source node 120. In addition, the fourth switch 103D is configured to control the connection between the cathode of the second battery 102B to the power source node 120.

Figure 7:
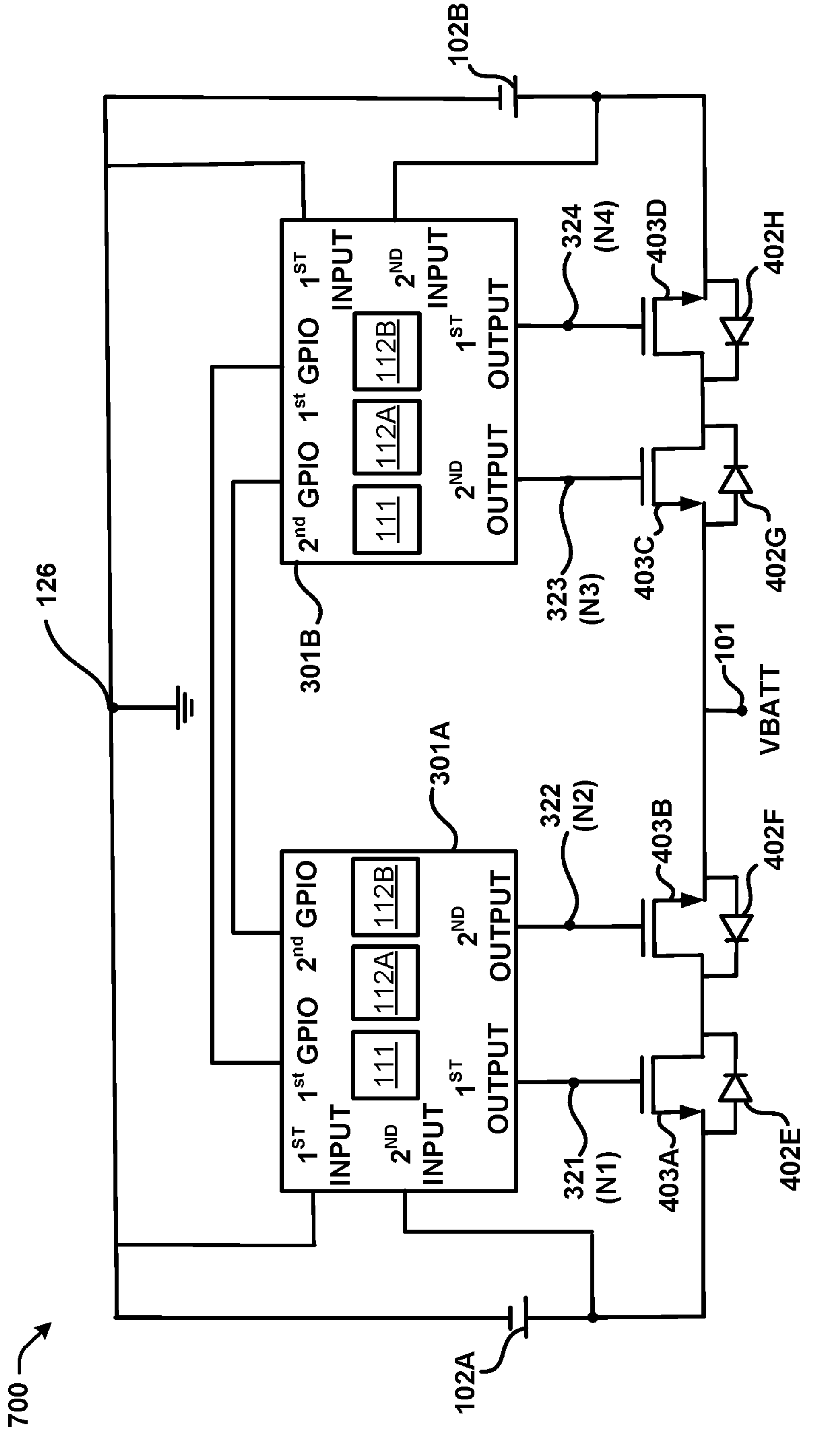
FIG. 7 shows a schematic diagram illustrating details of the components used for controlling the connectivity between a power source node and multiple batteries.

FIG. 7 shows a schematic diagram illustrating details of the components for coupling the output of the individual protection circuits and switches for controlling paths of resistance between a power source node and two batteries. Some components of FIG. 7 are configured in a manner similar to the circuit 300 shown in FIG. 4. However, in the example shown in FIG. 7, the source of the first transistor 403A is coupled to the cathode of the first battery 102A. In addition, the anode of the first diode 402E is coupled to the source of the first transistor 403A and the cathode of the first battery 102A. The gate of the second transistor 403B is coupled to the sixth node 326 and a source of the second transistor 403B is coupled to the power source node 120. The anode of the second diode 402F is coupled to the source of the second transistor 403B and the power source node 120. The anode of the batteries 102 are coupled to the ground node 126.

Also shown in FIG. 7, the source of the third transistor 403C is coupled to the power source node 120. The anode of the third diode 402G is coupled to the power source node 120 and the source of the third transistor 403C. In addition, in this example, the source of the fourth transistor 403D is coupled to the cathode of the second battery 102B. The anode of the eighth diode 402H is coupled to the source of the fourth transistor 403D and the cathode of the second battery 102B.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated methods can be ended at any time and need not be performed in its entirety.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus, comprising:

a first protection circuit module comprising one or more inputs, a control interface, and an output coupled to a first node, wherein the first protection circuit module is configured to activate the output coupled to the first node, activate a control signal at the control interface of the first protection circuit module, and transition to an internal protection state when a value of a signal at the one or more inputs of the first protection circuit module meets or exceeds one or more thresholds; and a second protection circuit module comprising one or more inputs, a control interface, and an output coupled to a second node, wherein the second protection circuit module is configured to activate the output coupled to the second node, activate the control signal at the control interface of the second protection circuit module, and transition to the internal protection state when a value of a signal at the one or more inputs of the second protection circuit module meets or exceeds one or more thresholds, wherein the control interface of the first protection circuit module is coupled to the control interface of the second protection circuit module, wherein the first protection circuit module is configured to activate the output coupled to the first node and transition to an external protection state when the second protection circuit module activates the control signal at the control interface of the second protection circuit module, and wherein the second protection circuit module is configured to activate the output coupled to the second node and transition to the external protection state when the first protection circuit module activates the control signal at the control interface of the first protection module.

2. The apparatus of claim 1, wherein the first protection circuit module is configured to transition to a clear protection state when the signal at the one or more inputs of the first protection circuit module no longer meets or exceeds one or more thresholds, in the clear protection state, the output of the first protection circuit module remains active and the control signal at the control interface of the first protection circuit module is deactivated.

3. The apparatus of claim 1, wherein the first protection circuit module is configured to transition to an exit protection state when the signal at the one or more inputs of the first protection circuit module no longer meets or exceeds one or more thresholds and when the first protection circuit module is receiving a deactivated control signal from the second protection circuit module, in the exit protection state the output of the first protection circuit module is deactivated and the control signal at the control interface of the first protection circuit module is deactivated.

4. The apparatus of claim 1, wherein the second protection circuit module is configured to transition to a clear protection state when the signal at the one or more inputs of the second protection circuit module no longer meets or exceeds one or more thresholds, in the clear protection state, the output of the second protection circuit module remains active and the control signal at the control interface of the second protection circuit module is deactivated.

5. The apparatus of claim 1, wherein the second protection circuit module is configured to transition to an exit protection state when the signal at the one or more inputs of the second protection circuit module no longer meets or exceeds one or more thresholds and when the second protection circuit module is receiving a deactivated control signal from the first protection circuit module, in the exit protection state, the output of the second protection circuit module is deactivated and the control signal at the control interface of the second protection circuit module is deactivated.

6. The apparatus of claim 1, further comprising:

a first switch comprising an input coupled to the first node, wherein the first switch creates a low impedance path for a first path when the first switch is on, and wherein the first switch creates a high impedance path or an open circuit for the first path when the first switch is off, wherein the first switch is configured to be off when the output of the first protection circuit is activated; and a second switch comprising an input coupled to the second node, wherein the second switch creates a low impedance path for a second path when the second switch is on, and wherein the second switch creates a high impedance path or an open circuit for the second path when the second switch is off, wherein the second switch is configured to be off when the output of the second protection circuit is activated.

7. The apparatus of claim 6, wherein the first switch comprises a transistor, wherein the input of the first switch is a gate of the transistor and the first path passes through a source of the transistor and a drain of the transistor.

8. The apparatus of claim 6, where in the transistor is a field-effect transistor or a metal oxide semiconductor field-effect transistor.

9. The apparatus of claim 6, wherein the second switch comprises a transistor, wherein the input of the second switch is a gate of the transistor and the second path passes through a source of the transistor and a drain of the transistor.

10. The apparatus of claim 9, where in the transistor is a field-effect transistor or a metal oxide semiconductor field-effect transistor.

11. The apparatus of claim 6, wherein the one or more inputs of the first protection circuit module comprise a first input coupled to a cathode of a first battery and a second input coupled to an anode of the first battery, and wherein the one or more inputs of the second protection circuit module comprise a first input coupled to a cathode of a second battery and a second input coupled to an anode of the second battery, wherein the first path couples the anode of the first battery to a ground node, and wherein the second path couples the anode of the second battery to the ground node.

12. The apparatus of claim 6, wherein the one or more inputs of the first protection circuit module comprise a first input coupled to a cathode of a first battery and a second input coupled to an anode of the first battery, and wherein the one or more inputs of the second protection circuit module comprise a first input coupled to a cathode of a second battery and a second input coupled to an anode of the second battery, wherein the first path couples the cathode of the first battery to a power source node, and wherein the second path couples the cathode of the second battery and the power source node.

13. An apparatus, comprising:

a first protection circuit module comprising one or more inputs, a first control interface, a second control interface, an output coupled to a first node, an output coupled to a second node, wherein the first protection circuit module is configured to activate the output coupled to the first node, activate a control signal at the first control interface of the first protection circuit module, and transition to a first protection state when one or more values of at least one signal at the one or more inputs of the first protection circuit module meets a first set of criteria, and wherein the first protection circuit module is configured to activate the output coupled to the second node, activate a control signal at the second control interface of the first protection circuit module, and transition to a second protection state when the one or more values of the at least one signal at the one or more inputs of the first protection circuit module meets a second set of criteria; and a second protection circuit module comprising one or more inputs, a first control interface, a second control interface, an output coupled to a third node, an output coupled to a fourth node, wherein the second protection circuit module is configured to activate the output coupled to the third node, activate the control signal at the first control interface of the second protection circuit module, and transition to a first protection state when one or more values of at least one signal at the one or more inputs of the second protection circuit module meets the first set of criteria, and wherein the second protection circuit module is configured to activate the output coupled to the fourth node, activate a control signal at the second control interface of the second protection circuit module, and transition to the second protection state when the one or more values of the at least one signal at the one or more inputs of the second protection circuit module meets the second set of criteria, wherein the first control interface of the first protection circuit module is coupled to the first control interface of the second protection circuit module, wherein the second control interface of the first protection circuit module is coupled to the second control interface of the second protection circuit module, wherein the first protection circuit module is configured to activate the output coupled to the first node and transition to a first external protection state when the second protection circuit module activates the control signal at the first control interface of the second protection circuit module, wherein the first protection circuit module is configured to activate the output coupled to the second node and transition to a second external protection state when the second protection circuit module activates the control signal at the second control interface of the second protection circuit module, wherein the second protection circuit module is configured to activate the output coupled to the third node and transition to a first external protection state when the first protection circuit module activates the control signal at the first control interface of the first protection circuit module, and wherein the second protection circuit module is configured to activate the output coupled to the fourth node and transition to a second external protection state when the first protection circuit module activates the control signal at the second control interface of the first protection circuit module.

14. The apparatus of claim 13, wherein the first protection circuit module is configured to transition to a first clear protection state when the values of at least one signal at the one or more inputs of the first protection circuit module no longer meet the first set of criteria, in the first clear protection state, the output coupled to the first node remains active and the control signal at the first control interface of the first protection circuit module is deactivated.

15. The apparatus of claim 13, wherein the first protection circuit module is configured to transition to a second clear protection state when the values of at least one signal at the one or more inputs of the first protection circuit module no longer meet the second set of criteria, in the second clear protection state, the output coupled to the second node remains active and the control signal at the second control interface of the first protection circuit module is deactivated.

16. The apparatus of claim 13, wherein the second protection circuit module is configured to transition to a first clear protection state when the values of at least one signal at the one or more inputs of the second protection circuit module no longer meet the first set of criteria, in the first clear protection state, the output coupled to the third node remains active and the control signal at the first control interface of the second protection circuit module is deactivated.

17. The apparatus of claim 13, wherein the second protection circuit module is configured to transition to a second clear protection state when the values of at least one signal at the one or more inputs of the second protection circuit module no longer meet the second set of criteria, in the second clear protection state, the output coupled to the fourth node remains active and the control signal at the second control interface of the second protection circuit module is deactivated.

18. The apparatus of claim 13, wherein the first protection circuit module is configured to transition to a first exit protection state when the values of at least one signal at the one or more inputs of the first protection circuit module no longer meet the first set of criteria and when the first protection circuit module is receiving a deactivated control signal from the first control interface of the second protection circuit module, in the first exit protection state, the output coupled to the first node is deactivated and the control signal at the first control interface of the first protection circuit module is deactivated.

19. The apparatus of claim 13, wherein the first protection circuit module is configured to transition to a second exit protection state when the values of at least one signal at the one or more inputs of the first protection circuit module no longer meet the second set of criteria and when the first protection circuit module is receiving a deactivated control signal from the second control interface of the second protection circuit module, in the first exit protection state, the output coupled to the second node is deactivated and the control signal at the second control interface of the first protection circuit module is deactivated.

20. The apparatus of claim 13, wherein the second protection circuit module is configured to transition to a first exit protection state when the values of at least one signal at the one or more inputs of the second protection circuit module no longer meet the first set of criteria and when the second protection circuit module is receiving a deactivated control signal from the first control interface of the first protection circuit module, in the first exit protection state, the output coupled to the third node is deactivated and the control signal at the first control interface of the second protection circuit module is deactivated.

21. The apparatus of claim 13, wherein the second protection circuit module is configured to transition to a second exit protection state when the values of at least one signal at the one or more inputs of the second protection circuit module no longer meet the second set of criteria and when the second protection circuit module is receiving a deactivated control signal from the second control interface of the first protection circuit module, in the first exit protection state, the output coupled to the fourth node is deactivated and the control signal at the second control interface of the second protection circuit module is deactivated.

22. The apparatus of claim 13, further comprising:

a first switch comprising an input coupled to the first node, wherein the first switch creates a low impedance path for a first path when the first switch is on, and wherein the first switch creates a high impedance path or an open circuit for the first path when the first switch is off, wherein the first switch is configured to be off when the output coupled to the first node is activated;

a second switch comprising an input coupled to the second node, wherein the second switch creates a low impedance path for a second path when the second switch is on, and wherein the second switch creates a high impedance path or an open circuit for the second path when the second switch is off, wherein the second switch is configured to be off when the output coupled to the second node is activated;

a third switch comprising an input coupled to the third node, wherein the third switch creates a low impedance path for a third path when the third switch is on, and wherein the third switch creates a high impedance path or an open circuit for the third path when the third switch is off, wherein the third switch is configured to be off when the output coupled to the third node is activated; and a fourth switch comprising an input coupled to the fourth node, wherein the fourth switch creates a low impedance path for a fourth path when the fourth switch is on, and wherein the fourth switch creates a high impedance path or an open circuit for the fourth path when the fourth switch is off, wherein the fourth switch is configured to be off when the output coupled to the fourth node is activated.

23. A method for controlling a first switch and a second switch, the first switch associated with a first protection circuit module, the second switch associated with a second protection circuit module, the method comprising:

receiving a signal at an input of the first protection circuit module;

generating an activated output signal at an output of the first protection circuit module in response to the signal reaching or exceeding one or more thresholds;

generating a first activated control signal at an interface of the first protection circuit module in response to the signal reaching or exceeding one or more thresholds;

receiving, at an interface of the second protection circuit module, the first activated control signal;

generating a second activated output signal at an output of the second protection circuit module in response to receiving the first activated control signal at the interface of the second protection circuit module;

causing a high impedance path in the first switch in response to receiving the first activated output signal at an input of the first switch; and causing a high impedance path in the second switch in response to receiving the second activated output signal at an input of the second switch.

24. The method of claim 23, wherein the method further comprises:

determining, at the first protection circuit module, that the signal no longer reaches or exceeds the one or more thresholds;

generating a deactivated control signal at the interface of the first protection circuit module in response to determining that the signal no longer reaches or exceeds the one or more thresholds;

generating a deactivated output signal at the output of the second protection circuit module in response to receiving the deactivated control signal at the interface of the second protection circuit module; and causing a low impedance path in the second switch in response to receiving the deactivated output signal at the input of the second switch.

25. The method of claim 23, wherein the method further comprises:

determining, at the first protection circuit module, that the signal no longer reaches or exceeds the one or more thresholds;

determining, at the first protection circuit module, that the second protection circuit module is generating a deactivated control signal;

generating a deactivated output signal at the output of the first protection circuit module in response to determining that the signal no longer reaches or exceeds the one or more thresholds and that the second protection circuit module is generating a deactivated control signal; and causing a low impedance path in the first switch in response to receiving the deactivated output signal at the input of the first switch.

26. The method of claim 23, further comprising:

receiving a second signal at an input of the second protection circuit module;

generating a second activated control signal at an interface of the second protection circuit module in response to the second signal reaching or exceeding at least one of the one or more thresholds;

receiving, at the interface of the first protection circuit module, the second activated control signal;

determining, at the first protection circuit module, that the signal no longer reaches or exceeds the one or more thresholds;

determining, at the first protection circuit module, that the second protection circuit module is generating the second activated control signal; and maintaining the activated output signal at the output of the first protection circuit module in response to determining that the second protection circuit module is generating the second activated control signal.

27. The method of claim 26, wherein the activated output signal generated at the output of the first protection circuit module is maintained until the second protection circuit module stops generating the second activated control signal at the interface of the second protection circuit module.

28. The method of claim 23, wherein the one or more thresholds is based on a current, a voltage, or a temperature detected by a sensor of the first protection circuit module.

* * * * *